United States Patent [19]

Gibbs et al.

[11] Patent Number: 4,485,192

[45] Date of Patent: Nov. 27, 1984

[54] PLASTISOL SEALING GASKETS PUFFED WITH HOLLOW DISCRETE SPHERES

[75] Inventors: David A. Gibbs, Waban; Robert H. Hofeldt, Littleton; Charles A. Billings, Concord, all of Mass.

[73] Assignee: W. R. Grace & Co., Cambridge, Mass.

[21] Appl. No.: 504,186

[22] Filed: Jun. 14, 1983

Related U.S. Application Data

[63] Continuation-in-part of Ser. No. 433,585, Oct. 12, 1982, abandoned, and a continuation-in-part of Ser. No. 328,968, Dec. 9, 1981, abandoned.

[51] Int. Cl.$^3$ .............................. C08J 9/32; C08J 9/36
[52] U.S. Cl. ........................................ 521/54; 521/73; 521/74; 521/75; 523/219
[58] Field of Search .................. 521/54, 73, 75, 74; 523/219

[56] References Cited

U.S. PATENT DOCUMENTS

| | | | |
|---|---|---|---|
| 2,885,303 | 5/1959 | Kaplan | 521/75 |
| 3,043,045 | 7/1962 | Martuch | 521/75 |
| 3,230,184 | 1/1966 | Alford | 260/2.5 |
| 3,247,158 | 4/1966 | Alford et al. | 521/54 |
| 3,265,785 | 8/1966 | Rainer | 521/73 |
| 3,353,981 | 11/1967 | Jacob | 521/54 |
| 3,383,337 | 5/1968 | Garling | 521/54 |
| 3,409,567 | 11/1968 | Dinsdale et al. | 260/5 |
| 3,444,281 | 5/1969 | Cahill et al. | 521/73 |
| 3,574,147 | 4/1971 | Giessler et al. | 521/75 |
| 3,608,010 | 9/1971 | Stayner | 264/51 |
| 3,627,707 | 12/1971 | Giessler et al. | 521/73 |
| 3,670,091 | 6/1972 | Franz et al. | 174/52 PE |
| 3,695,477 | 10/1972 | Edmonston et al. | 521/75 |
| 3,855,160 | 12/1974 | Shiotsu et al. | 521/136 |
| 3,873,475 | 3/1975 | Pechacek | 260/2.5 B |
| 3,914,360 | 10/1975 | Gunderman et al. | 264/51 |
| 4,005,033 | 1/1977 | Georgeau et al. | 260/2.5 B |
| 4,020,966 | 5/1977 | Wszolek | 215/349 |
| 4,100,114 | 7/1978 | Naka | 521/175 |
| 4,107,134 | 8/1978 | Dawans | 260/42.17 |
| 4,130,213 | 12/1978 | Wszolek | 264/268 |
| 4,147,824 | 4/1979 | Dettmann et al. | 428/65 |

FOREIGN PATENT DOCUMENTS 41079 1/1974 Japan .

OTHER PUBLICATIONS

"Glass Microballoon Particles, a Low Density Filler" Alford et al., pp. 141, 142, 145, 146, 150 and 223.

*Primary Examiner*—Morton Foelak
*Attorney, Agent, or Firm*—William L. Baker; Carole F. Barrett

[57] ABSTRACT

A container sealing composition made from a plastisol having a mass of hollow discrete microspheres incorporated therein. The composition is characterized by having increased shelf life, as manifested in reduced separation of the hollow discrete microspheres from the plastisol, and improved viscosity stability. The container sealing composition also exhibits uniform void volume which is essential for good sealability and seal quality.

10 Claims, No Drawings

PLASTISOL SEALING GASKETS PUFFED WITH HOLLOW DISCRETE SPHERES

BACKGROUND OF THE INVENTION

This application is a continuation-in-part of Ser. No. 328,968 filed Dec. 9, 1981 and currently pending application Ser. No. 433,585 filed Oct. 12, 1982, both now abandoned.

This invention relates to sealing compositions for container closures, e.g. covers, crowns and caps and more particularly for sealants prepared from plastisols having a mass of hollow discrete microspheres incorporated therein.

The term "void volume" refers to the proportion or percentage of a gasket which is devoid of gasket forming material. A typical foamed gasket made from a plastisol may have a void volume as low as about 5 percent or as high as about 75 percent.

The void volume of gaskets prepared from a plastisol composition may suffer from a lack of uniformity due to changes in processing temperature, changes in amount of chemical blowing agent, or variations in film weight, closure weight, closure metal, or temperature distribution across the fluxing oven. Non-uniformity in the void volume of gaskets is undesirable from a commercial standpoint because it frequently causes variations in seal quality, seal appearance, removal torques when the gasket is employed on screw cap bottles and product quality. Therefore, maintaining a uniform void volume in the gasket is essential to good sealability and seal quality.

Several U.S. patents disclose plastisols containing a mass of hollow discrete spheres incorporated therein; however, none of these patents, which will be discussed hereinafter, disclose plastisols which are eminently suitable for container sealing compositions.

U.S. Pat. No. 3,409,567 discloses a vulcanizable composition for forming gaskets in closure elements for containers comprised of a rubber latex, a vulcanizing agent for the rubber, an ammonium soap, zinc soap, zinc oxide, a non-ionic surfactant which is a condensation product of an alkylene oxide and a member selected from a long chain fatty alchol, acid or amine, and a filler. The patent further discloses that a porous layer may be obtained by incorporating microballoons, but this in generally less desirable than a solid layer, except for certain applications such as in providing sealing gaskets for drums.

U.S. Pat. No. 4,005,033 discloses a sealant formulation comprising an acrylic latex or a vinyl acrylic latex and hollow, resilient expandable thermoplastic resinous microspheres formed from an expandable copolymer of vinylidene chloride and acrylonitrile.

U.S. Pat. No. 3,247,158 discloses a vinyl plastisol composition containing as a filler a mass of hollow discrete spheres of synthetic, fused, water-insoluble alkali metal silicate-based glass.

U.S. Pat. No. 3,230,184 discloses a polyester resin molding composition containing as a filler a mass of hollow discrete spheres of synthetic, fused, water-insoluble alkali metal silicate-based glass.

U.S. Pat. No. 4,107,134 discloses a low density resin composition comprising a polybutadiene having an average molecular weight by number lower than 100,000, and inorganic or organic hollow spheres included in the resin.

U.S. Pat. No. 4,100,114 discloses a rigid polyurethane foam composition containing 5 to 20% by weight of hollow-spherical silica balloons and 0.2 to 2% by weight of an organosilane compound.

Typically, in industrial applications sealing compositions are mixed at one location and shipped to a second location where the gaskets are manufactured. Even when mixing and gasket manufacture occur in the same plant, a period of time elapses between mixing of the sealing composition and production of the gaskets therefrom. The maximum time which can elapse between mixing the sealing composition and manufacturing a gasket without redistribution of the components of the sealing composition is referred to as "the shelf life" of the sealing composition.

Increasing the shelf life of the sealing compositions is extremely important since reachievement of uniformity of distribution of the components of the sealing composition is, at best, difficult once separation occurs. After separation has occured the most effective way to redistribute the components uniformly has been with a vacuum system. These vacuum systems are not only expensive but are generally not available at the manufacturing site. This long standing problem of redistribution is related to the shelf life of the sealing composition. If the shelf life of the sealing composition is lengthened, the need to redistribute the components is diminished.

One way to increase the shelf life is to increase viscosity; however, this is an impractical alternative because the fluid application machinery used in the industry dictates use of gasketing material with relative low viscosity. The inventors herein have discovered a method of increasing the shelf life of a sealing composition while maintaining a workable viscosity which is acceptable in the industry. That is, it has been discovered that the stability of the sealing composition can be improved within the narrow range of viscosities necessary to produce sealing gaskets from sealing compositions using fluid application machinery current being used.

Further, the inventors herein have discovered that the improved sealing compositions of the present invention can be formed into sealing gaskets which have uniform void volume. That is, it is surprising that the hollow spheres within the gasketing composition of the present invention remained almost totally uncrushed when the composition was forced through small diameter lining nozzles and into closures. Further, it was surprising that the sealing performance of gaskets wherein the voids are produced entirely by rigid hollow microspheres are equivalent or superior to gaskets having conventional flexible air voids.

Therefore, it is an advantage of this invention to provide sealing gaskets for container closures which exhibit a uniform void volume and do so independently of gasket manufacturing conditions.

It is another advantage to manufacture a sealing gasket composition which can be stored for a prolonged period, called "prolonged aging", without undergoing excessive viscosity increases or undesirable separation of components at room temperature. Prolonged aging as used herein means that a composition has a shelf life of more than two and one half weeks.

It is a further advantage to provide a sealing gasket composition which will allow covers, crowns and caps to be processed at a lower temperature, thus yielding a substantial energy saving and reducing the likelihood of heat degradation of the plastisol composition.

It has been discovered that sealing gaskets having the foregoing desirable characteristics can be prepared by employing a liquid plastisol base which incorporates a mass of hollow discrete microspheres. Resins which are suitable for the liquid plastisols of this invention are characterized as being prepared by emulsion (dispersion), suspension or mass polymerization. Hollow microspheres which are suitable for the liquid plastisols are characterized as being formed from water-insoluble alkali metal silicate based glass, polystyrene resins, phenolic resins or polyvinylidene chloride acrylonitrile resins and as having an alkalinity below about 0.5 milliequivalents per gram. It has also been discovered that in certain cases separation inhibitors such as colloidal silica, aluminum stearate waxes or bentonite clay can be added to the formulation to improve the stability of the plastisols.

SUMMARY OF THE INVENTION

This invention involves a sealing composition for container closures, such as covers, crown and caps. The composition is a plastisol which comprises a resin, a plasticizer, and hollow discrete microspheres incorporated therein. The fluid composition exhibits increased shelf life and a low degree of separation of the spheres from the plastisol. In addition, the gaskets formed from the sealing compositions exhibit uniform void volume which is necessary for promoting good seal quality.

DETAILED DESCRIPTION

The preferred microspheres of this invention can be characterized as being hollow discrete spheres of synthetic, water-insoluble alkali metal silicate-based glass. Non-glass spheres such as polystyrene and phenolic types may also be used. The spheres of this invention have solid walls of approximately uniform density and smooth surfaces. The spheres should have a diameter within the range of from about 1 to about 300 microns and preferably from about 10 to about 150 microns. Within the preferred range the average sphere diameter will usually be from about 15 to about 80 microns.

The wall thickness can be expressed as a percentage of the diameter of the microspheres and will be from about 0.1 to about 20 percent thereof, preferably from about 0.5 to about 5 percent of the diameter of particles having a diameter of 15 to 100 microns.

The preferred hollow microspheres used in the composition of this invention can be made from an alkali metal silicate which has the formula $(Me_2O)_x{:}(SiO_2)_y.$ Various alkali metal silicates within the range where x is 1, y is 0.5 to 5 and Me is an alkali metal such as sodium, potassium, or lithium are satisfactory. Suitable alkali metal silicates include $Na_2O(SiO_2)_{3.22}$. A silicate insolubilizing agent must be added to render the hollow spheres more resistant to moisture. Suitable insolubilizing agents are oxides of metal and metalloids such as, for example, the oxides of zinc, aluminum, iron, boron, and magnesium. The negative radicals such as borates and aluminates are preferred. These are the preferred insolubilizing materials because they reduce the alkalinity of the hollow microspheres.

The hollow discrete microspheres to be employed are generally selected on the basis of the viscosity desired for the plastisol composition. For Brookfield Viscosities measured at 60 rpm, viscosities range from about 3,000 to about 5,000 cps at room temperature, the preferred hollow glass spheres have diameters ranging from about 10 to about 60 microns. For Brookfield Viscosities measured at 60 rpm, viscosities range from about 15,000 to 70,000 cps at room temperature, the preferred hollow glass spheres have diameters ranging from about 10 to 150 microns.

TABLE I

| Manufacture | Brand | Average Particle Density (g/cc) | Strength (Pressure for 10% Collapse psi)* | Alkalinity (milliequivalents per gram)** | Average Diameter (microns) | Wall Thickness (microns) |
|---|---|---|---|---|---|---|
| Emerson & Cuming, Canton, MA | FTF15 | 0.30 | 1500 | 0.5 or less | 15 | 0.7 |
| 3M Company, St. Paul, MN | C15/250 | 0.15 | 250 | 0.5 or less | 70 | 0.5–2 |
| 3M Company, St. Paul, MN | B23/500 | 0.23 | 500 | 0.5 or less | 70 | 0.5–2 |
| 3M Company, St. Paul, MN | E22-X | 0.22 | 750 | 0.5 or less | 30 | 0.5–2 |
| 3M Company, St. Paul, MN | C37/3700 | 0.37 | 3700 | 0.5 or less | 70 | 0.5–2 |
| Arco, Philadelphia, PA | Dylite (Polystyrene) | 0.30 | — | 0.5 or less | Expandable | |
| Union Carbide, NY, NY | B50-0840 (Phenolic) | 0.25–0.35 | — | 0.5 or less | 5–130*** | |

*ASTM D 3102-72 (using glycerol in place of water). These nominal values may vary by ± 20%.
**ASTM D 3100
***Range of Particle size Microballoons having a low alkalinity, herein defined as about 0.5 milliequivalents per gram or less, are preferred and may be used with or without addition of separation inhibitors as those items are generally understood. Microballoons having a high alkalinity, herein defined as more than about 0.5 milliequivalents per gram, may be used in this invention but only in combination with certain separation inhibitors.

The properties of the hollow discrete spheres which are suitable for the present invention are set forth in Table I.

Selection of the proper type of resin was found to be important to the stability of the sealing composition of the present invention. It was found that at least about 70% (percent by weight) of the resin should be prepared by emulsion (dispersion) polymerization. More preferably at least about 75% should be prepared by the emulsion method and most preferably 100% of the resin should be prepared by the emulsion method. A maximum of about 30% of the resin should be prepared by suspension of mass polymerization or a combination thereof. A preferred dispersion resin to be employed in forming the sealing composition of the present invention is one with an ASTM designation of D6-42. Other suitable dispersion resins are those having ASTM designations of D4-43, D3-67, D6-33, D4-95, D5-94, and D3-54.

It has been found that addition of surfactants to the dispersion (emulsion) resins after they are prepared increases separation.

The plasticizers which can be used in conjunction with resins are basically of two different types, the solvating and non-solvating types. The solvating types tend to swell the resin and permit a more rapid fusion. The non-solvating types do not cause swelling and tend to cause slower fusion, but serve to render the plastisol more viscosity stable at room temperature. Any plasticizer conventionally employed in plastisol technology may be employed in this invention. Representative plasticizers include the phthalate esters such as butyl phenyl phthalate, di-2-ethylhexyl phthalate, dibutoxyethyl phthalate, capryl phthalate, octyl decyl phthalate, di-2-ethylhexyl tetrahydrophthalate, dicyclohexyl phthalate; the adipates such as butyl cellosolve adipate, dioctyl adipate, and di-2-ethylhexyl adipate which yield good low temperature properties; the phosphates which impart good flame resistance such as octyl diphenyl phosphate, triisooctyl phosphate, triocytl phosphate, tricresyl phosphate, tributoxyethyl phosphate, cresyl diphenyl phosphate; the sebacates such as dioctyl sebacate; and the epoxy plastizers which impart viscosity stability, good migration resistance and superior heat stability, such as an epoxidized unsaturated oil. Other conventionally used plasticizers such as butyl phthalate, butyl glycolate and tetraethylene glycol diisohexoate may also be employed.

Certain separation inhibitors may be added to the plastisol of the present invention to improve the shelf life of the sealing composition of the present invention. The purpose of a separation inhibitor is to retard the separation of the hollow discrete spheres from the plastisol. Separation of the hollow spheres from the plastisol is normally a problem because many end users do not have facilities for mixing and deaerating. Generally, low density microspheres will rise to the top of the plastisol composition. The inventors herein found that addition of a separation inhibitor was effective when 100% of the resin had been formed by the dispersion method. In such cases, separation of microballoons having either high or low alkalinity was inhibited. Further, it was discovered that suitable separation inhibitors for plastisol compositions having a viscosity below 15,000 cps include microcrystalline waxes, hydrogenated castor oil, bentonite, and aluminum stearate and that suitable separation inhibitors for plastisol compositions having a viscosity above 15,000 cps include fumed silica, bentonite, and waxes.

About 0.1 to about 10 parts by weight separation inhibitor per 100 parts by weight resin may be employed. The finished plastisol will contain from about 50 to about 150 parts by weight of plasticizer per 100 parts by weight of resin, depending upon the particular plasticizer, the particular resin, and the particular properties desired in the final product. At least about 70% of the resin should be formed by dispersion polymerization. The hollow discrete spheres should be used in an amount from about 5 parts to about 100 parts by volume per 100 parts by weight of resin. The amount of the hollow spheres depends upon the density of the microspheres and the final desired void volume.

The method of formulating a plastisol containing the discrete spheres is in accordance with convention. A preferred method involves the use of a shear type mixer having a cooling jacket to prevent excessive buildup of heat which might cause premature gellation of the plastisol.

In the preferred method, a portion of the plasticizer is added to the mixing apparatus first. Any compounding ingredients are generally dispersed in plasticizer and then added to the plasticizer in the mixing apparatus. Next, the resin is added slowly with agitation. Plasticizer is added as required to keep the mixture fluid. Generally, the remaining plasticizer is added when the plastisol is homogeneous.

At this point, the hollow microspheres are added to the plastisol. Although the microspheres can be added prior to this point, it is preferred to add them after the plastisol is formed in order to minimize breaking the hollow microspheres during mixing.

After the hollow microspheres have been added to the plastisol, the dispersion is mixed until smooth. A mixing time of the order of ten minutes is generally satisfactory. The resulting mixture is then dearated.

After the sealing composition has been prepared, it can be used to prepare sealing gaskets in accordance with conventional technology. A desirable method for preparing sealing gaskets is disclosed in U.S. Pat. No. 3,563,936. This method involves the steps of:

(1) Dispensing a fixed amount of the plastisol into a bottle cap or crown or a can end.
(2) Contacting the plastisol with a hot mold to form it into a fluxed gasket and/or passing the whole through an oven at a 300°–450° F. for 20–500 seconds.

The following specific examples are illustrative but not limitative of our invention, it being understood that similar improved results are obtainable with other combinations of components equivalent to those set forth in the examples. All such variations which do not depart from the basic concept of the invention and composition disclosed above are intended to come within the scope of the appended claims.

EXAMPLES 1–8

Approximately two-third of the specified amount of plasticizer was introduced initially to a low shear mixer, e.g. a paddle or Hobart mixer. This was followed by introduction of the specified additives. Next the resin was added slowly, and the resulting mixture was stirred until smooth. The remaining plasticizer was then added. Finally, the hollow glass microspheres were added with slow agitation to prevent their rupture. When the resulting mixture was smooth, it was deaerated.

Table II demonstrates the effect that the method of polymerization of the resin component of the plastisol has upon separation of the hollow glass microspheres after prolonged aging. Within two and one half weeks all of the formulations shown in Table 2 had separated except for formulation 2. The plastisol composition of formulation 2 was allowed to stand up to four months after preparation and still had not separated.

Table II shows that separation of the hollow glass spheres from the plastisol composition after prolonged aging at room temperature occurs when the resin component employed in the plastisol composition contains too high of a percentage of non-dispersion type resin. The resin component should contain at least about 70 phr (70 percent) of dispersion resin. It is preferred that at least about 75 phr (75 percent) of dispersion resin be employed. The sealing composition of Example 2 which contained 100% dispersion resin was stable after prolonged aging. The sealing compositions of Examples 4–8 which did not contain more than 70% dispersion resin separated after prolonged aging.

TABLE II

Effects of Resin Types Upon Separation of Hollow Glass Spheres

| | 1 | 2 | 3 | 4 | 5 | 6 | 7 | 8 |
|---|---|---|---|---|---|---|---|---|
| Resin, phr | | | | | | | | |
| D6-42, homopolymer (dispersion) | 100 | 100 | 60 | 60 | 60 | 70 | 60 | 65 |
| D3-54, copolymer (dispersion) | — | — | 40 | — | — | — | — | — |
| GP3-86200, mass polymerized | — | — | — | 40 | 40 | — | — | — |
| GP1-87000, mass polymerized | — | — | — | — | — | 30 | — | — |
| GP3-17240, mass polymerized | — | — | — | — | — | — | 40 | — |
| GP3-86200, suspension | — | — | — | — | — | — | — | 35 |
| Plasticizer, phr | | | | | | | | |
| Dioctyl Phthalate | 65 | 68 | 78 | 75 | 69 | 78 | 78 | 68 |
| Heat Stabilizers, phr | | | | | | | | |
| Calcium-zinc stearate | — | — | 1 | — | — | 1 | 1 | — |
| Zinc stearate | — | — | 1.5 | — | — | 1.5 | 1.5 | — |
| Separation Inhibitors, phr | | | | | | | | |
| Wax, 127–130° F. melt pt | — | — | 3 | — | — | — | — | — |
| Wax, 112–122° F. melt pt | — | — | — | — | — | 3 | 3 | — |
| Cab-O-sil M-5 | — | — | 0.2 | — | — | 0.2 | 0.2 | — |
| Hollow Glass Sphere, phr | | | | | | | | |
| Emerson & Cuming IG25 (high alk) | 14 | — | 14 | 14 | — | 14 | 14 | — |
| 3M C15/250 (low alk) | — | 6 | — | — | 6 | — | — | 6 |
| Viscosity, Brookfield cps @ 60 rpm | | | | | | | | |
| Initial, room temperature | 5,200 | 5,720 | 10,000 | 5,100 | 3,650 | 4,770 | 10,000 | 3,600 |
| Initial, 110° F. | — | — | 1,780 | — | — | 1,720 | 1,810 | — |
| Separation after 2½ weeks | | | | | | | | |
| room temperature | yes | no | yes | yes | yes | yes | yes | yes |

EXAMPLE 9-14

The compositions of Examples 9–14 were prepared in the same manner as that employed in Examples 1–8. The composition of Example 9 is the same as the composition of Example 1. The composition of Example 11 is the same as the composition of Example 2.

Table III demonstrates the effect of the composition of hollow sphere upon (1) separation of the spheres from the plastisol composition and (2) molding characteristics of the plastisol composition. Table III also shows the effect of alkalinity of the glass hollow spheres upon these characteristics. The compositions containing low alkalinity ceramic microspheres separatd even though a separation inhibitor was included, whereas the compositions using low alkaline phenolic or polystyrene microspheres did not separate. The composition of Example 9 (same as Example 1) separated although it was composed of 100% dispersion resin, whereas the composition of Example 11 (same as Example 2) was also comprised of 100% dispersion but did not separate. Low alkaline microspheres were used in Example 11 whereas microspheres having high alkalinity were used in Example 9.

TABLE III

Effects of Alkalinity and Material of Construction of Hollow Spheres on Separation and Molding Characteristics

| | 9(1) | 10 | 11(2) | 12 | 13 | 14 |
|---|---|---|---|---|---|---|
| Resin, phr | | | | | | |
| D6-42, homopolymer | 100 | 100 | 100 | 100 | 100 | 100 |
| Plasticizer, phr | | | | | | |
| Dioctyl Phthalate | 65 | 131 | 68 | 78 | 81 | 70 |
| Heat Stabilizers, phr | | | | | | |
| Calcium-zinc stearate | — | 1.2 | — | 1 | 1 | — |
| Zinc octoate | — | — | — | 2 | — | 2 |
| Zinc stearate | — | 1.8 | — | 1.5 | 1.5 | — |
| Separation Inhibitors, phr | | | | | | |
| Wax, paraffinic (127–130° F. melt pt) | — | 3 | — | 3 | — | — |
| Petrolatum | — | — | — | 3 | — | 3 |
| Hollow Microsphere, phr | | | | | | |
| Emerson & Cuming IG 25 | 14 | — | — | — | — | — |
| Emerson & Cuming Fillite FA-A | — | 8 | — | — | — | — |
| 3M C15/250 | — | — | 6 | — | — | — |
| 3M E 22-X | — | — | — | 15 | — | — |
| Union Carbide BJO-0840 | — | — | — | — | 11 | — |
| Arco, 270-P | — | — | — | — | — | 5 |
| Hollow Sphere | | | | | | |
| Material | glass | ceramic | glass | glass | phenolic | polystyrene |
| Alkalinity | high | low | low | low | low | low |
| Density | 0.24 | 0.7 | 0.15 | 0.22 | 0.2 | 0.3 |
| Separation after 2–5 weeks | yes | yes | no | no | no | no |
| Molding characteristics | good | poor | good | good | fair | poor |

EXAMPLES 15-22

Table IV demonstrates the effect of separation inhibitors and surfactants on minimizing separation of the hollow glass microspheres from the plastisol composition after prolonged aging. The compositions of Examples 15-22 were prepared by the same procedure as that employed in the compositions of Examples 1-8. The compositions were allowed to stand two months after preparation.

The sealing composition of Example 22 which includes no separation inhibitors includes a 100% dispersion resin and high alkaline microspheres separated within 2 months. In the compositions of 15-21 certain separation inhibitors were added to improve stability. Examples 15, 18, and 19 show that additions of certain inhibitors at certain levels improved stability. Examples 21 and 22 demonstrate that certain added surfactants actually decrease stability.

labelled (b) contains low alkaline microspheres. The composition of Example 23(a) is the same as that of Example 1 and the composition of Example 23(b) is the same as that of Example 2. A relative viscosity increase of 1 is equal to 100% change in viscosity and an increase of 2 is equal to a change of 200% in viscosity. Comparison of each of the composition of example (a) with its comparable example (b) shows that those compositions using high alkaline microspheres undergo a greater change in viscosity than a comparable system using low alkaline microspheres.

TABLE V

| Effects of Various Resins and Alkalinity of Hollow Glass Spheres on Viscosity Stability | | | | | | | | | | | | | |
|---|---|---|---|---|---|---|---|---|---|---|---|---|---|
| | 23 | | 24 | | 25 | | 26 | | 27 | | 28 | | 29 |
| Paste Resin*, phr | | | | | | | | | | | | | |
| D6-42 | 100 | | — | | — | | — | | — | | — | | — |
| D7 | — | | 100 | | — | | — | | — | | — | | — |
| D4-33 | — | | — | | 100 | | — | | — | | — | | — |
| D5-94 | — | | — | | — | | 100 | | — | | — | | — |
| D5-23 | — | | — | | — | | — | | 100 | | — | | — |
| D5-32 | — | | — | | — | | — | | — | | 100 | | — |
| D5-94 | — | | — | | — | | — | | — | | — | | 100 |
| Plasticizer, phr | (a) | (b) | (a) | (b) | (a) | (b) | (a) | (b) | (a) | (b) | (a) | (b) | (a) | (b) |
| Dioctyl Phthalate | 65 | 68 | 75 | 69 | 69 | 65 | 77 | 77 | 68 | 65 | 79 | 76 | 69 | 71 |
| Hollow Glass Sphere, phr*** | | | | | | | | | | | | | | |
| Emerson & Cuming IG 25 | 14 | — | 14 | — | 14 | — | 14 | — | 14 | — | 14 | — | 14 | — |
| 3M C15/250 | — | 6 | — | 6 | — | 6 | — | 6 | — | 6 | — | 6 | — | 6 |
| Alkalinity | high | low | high | low | high | low | high | low | high | low | high | low | high | low |
| Relative Viscosity Increase** | | | | | | | | | | | | | | |
| High alkalinity (2.4 ave.) | 2.3 | | 2.2 | | 3.7 | | 3.1 | | 2.8 | | 1.0 | | 1.4 | |
| Low alkalinity (1.2 ave.) | | 1.3 | | 1.1 | | 1.5 | | 1.4 | | 2.2 | | 0.9 | | 0.3 |

*This classification is according to ASTM D 1755
**This is the relative increase in the Brookfield viscosity as measured at 60 rpm and room temperature upon aging three weeks at ambient temperature.
***The void volume ranged from 19-25 percent.

From the relative viscosity increase shown in Table V, it can be inferred that the alkalinity of the hollow

TABLE IV

| Effects of Additives on Minimizing the Separation of High Alkaline of Hollow Glass Spheres | | | | | | | | |
|---|---|---|---|---|---|---|---|---|
| | 15 | 16 | 17 | 18 | 19 | 20 | 21 | 22 |
| Resin, phr | | | | | | | | |
| D6-42, homopolymer (dispersion) | 100 | 100 | 100 | 100 | 100 | 100 | — | 100 |
| D1-22, homopolymer (dispersion) | — | — | — | — | — | — | 100 | — |
| Plasticizer, phr | | | | | | | | |
| Dioctyl Phthalate | 78 | 80 | 80 | 80 | 80 | 66 | 60 | 80 |
| Heat Stabilizers, phr | | | | | | | | |
| Calcium-zinc stearate | 0.8 | 0.8 | 0.8 | 1 | 1 | 1 | — | 1 |
| Zinc stearate | 1.2 | 1.2 | 1.2 | 1.5 | 1.5 | 1.5 | — | 1.5 |
| Zinc octoate | — | — | — | — | — | — | 2.5 | — |
| Separation Inhibitors and Surfactants, phr | | | | | | | | |
| Cab-O-Sil M-5 | 0.2 | — | — | — | — | — | — | — |
| Wax, paraffinic (127-130° F. melt pt) | 2 | — | — | — | — | — | — | — |
| Surfactant, sodium dioctyl sulfosuccinate | — | 2 | — | — | — | — | — | — |
| Surfactant, paraffinic sulfonate K30, Mobay Chemical | — | — | 1.2 | — | — | — | — | — |
| Thickener, aluminum stearate | — | — | — | 5 | — | — | — | — |
| Thickener, Bentone 34 from NL Industries | — | — | — | — | 2 | — | — | — |
| Surfactant, BYK I, Mallinckrodt | — | — | — | — | — | — | — | — |
| Petrolatum | — | — | — | — | — | 5 | 3 | — |
| Surfactant, Tween 60, Atlas Chemical | — | — | — | — | — | 5 | 2 | — |
| Hollow Glass Sphere, phr | | | | | | | | |
| Emerson & Cuming FA-A (high alk) | — | — | — | — | 13.6 | — | — | — |
| Emerson & Cuming IG 25 (high alk) | 14 | 14 | 14 | 14 | — | 14 | — | 14 |
| BM E22X (Low alk) | — | — | — | — | — | — | 14.7 | — |
| Separation within two months | no | yes | yes | slight | no | yes | yes | yes |

EXAMPLES 23-29

Table V demonstrates the effect of alkalinity of the hollow glass spheres upon the viscosity stability of the sealing composition. These compositions were prepared by means of the method employed in Examples 1-8. In each of the compositions of Example 23-29, the system labelled (a) contains high alkaline microspheres and that microspheres affects the viscosity stability of the plastisol. If the alkalinity of the hollow spheres is relatively low, i.e., equal to or less than about 0.5 milliequivalents/gram, the viscosity of the plastisol does not increase unacceptably upon aging. If the alkalinity of the hollow glass microspheres is relatively high, i.e. greater than about 0.5 milliequivalents/gram, the viscosity increases unacceptably upon aging. Thus, to improve the shelf life of the plastisol composition it is preferable to employ hollow glass spheres having low alkalinity.

Table V shows, however, that even when low alkaline microspheres are used not all dispersion resins produce sealing compositions which have equally satisfactory viscosity from a stability point of view.

EXAMPLES 30-33

Table VI demonstrates the effect of size and density of the hollow glass microspheres upon the degree of separation of the spheres from the plastisol composition. The compositions were prepared according to the method used in Examples 1-8.

TABLE VI

Effects Of Size Of Hollow Glass Spheres Upon Separation In Plastisols

|  | 30 | 31 | 32 | 33 |
|---|---|---|---|---|
| Resin, phr |  |  |  |  |
| D6-42, homopolymer | 100 | 100 | 100 | 100 |
| Plasticizer, phr |  |  |  |  |
| Dioctyl Phthalate | 78 | 78 | 78 | 60 |
| Dioctyl Adipate | — | — | — | 20 |
| Heat Stabilizer, phr |  |  |  |  |
| Calcium-zinc stearate | 1 | 1 | 1 | 1 |
| Zinc stearate | 1.5 | 1.5 | 1.5 | — |
| Separation Inhibitor, phr |  |  |  |  |
| Paraffin wax, (127-130° F. melt pt) | 3 | 3 | 3 | — |
| Paraffin wax, (117-127° F. melt pt) | — | — | — | 6 |
| Hollow Glass Sphere, phr |  |  |  |  |
| Emerson & Cuming IG25 (high alk) | 21 | — | — | — |
| 3M C15-250 (low alk) | — | 10 | — | — |
| 3M E22-X (low alk) | — | — | 14.7 | — |
| Emerson & Cuming FTF15 low alk | — | — | — | 43.2 |
| Brookfield Viscosity, (60 rpm/ 110° F.) cps | 1170 | 1590 | 1710 | ~9000 |
| Diameter (microns), approximately | 80 | 80 | 40 | 15 |
| Density (g/ml) | 0.23 | 0.15 | 0.22 | 0.30 |
| Separation upon prolonged aging | very slight | slight | none | none |

As the diameter of the hollow glass spheres decreases and as the density increases, the degree of separation of the spheres from the plastisol also decreases. This relationship can be explained by Stokes Law which holds that the separation rate is directly proportional to the product of (1) the difference in density between the microspheres and the plastisol medium, and (2) the square of the radius of the microspheres, and is inversely proportional to the viscosity of the plastisol.

EXAMPLES 34-36

Table VII demonstrates the sealing performance of the gaskets made from the plastisols which have the hollow microspheres incorporated therein. The sealing compositions which were used to make the gaskets of Examples 34 and 35 were prepared in the same manner as the compositions in Examples 1-8.

Gaskets were prepared by dispensing approximately 140 mg of the sealing composition into a standard bottle crown which then was placed in a heated platen and immediately contacted with a hot die for 2.2 seconds.

The sample gaskets Examples 34 and 35 prepared by the foregoing method were compared with the gasket of Example 36 which was prepared from commercial plastisol gasket composition, CP 3133, from Chemical Products Corporation. This composition contains a chemical blowing agent but no microspheres. The comparisons were made by means of the Stack Test and the Abuse Angle Test.

The Stack Test comprised the following steps:

Ten bottles containing dilute sulfuric acid were capped with the gasketed crowns. Three of the bottles were used as unstacked controls. Immediately prior to capping, a sodium bicarbonate tablet was added to each of the bottles. The tablet generated 3.0 gas volumes of carbon dioxide upon contact with the acidic liquid. Next the packs were pasteurized at 140° F. for 20 minutes and then a 100 pound load was applied to the top of each crowned bottle. After one week, the bottles were unstacked, cooled to 60±5°, shaken for 15 seconds, and then the pressure was measured. The pressure was converted to gas volume using standard tables.

The Abuse Angle Test comprised the following steps:

Ten bottles containing dilute sulfuric acid were capped with the gasketed crowns. Immediately prior to capping, a sodium bicarbonate tablet was added to each of the bottles. This tablet generated a 3.0 gas volume of carbon dioxide upon contact with the acidic liquid. The sample bottles remained standing for 24 hours at room temperature before being tested. The test consisted of dropping the bottle down at 70° incline onto its crown from distances of 1, 2 and 3 inches. The sample bottle was dropped four times at each height with a 90° rotation between drops. The numerical rating for each drop was the drop distance in inches. The overall rating for each sample was the sum of the individual drop ratings up to the point at which the bottle first began to leak. Scores can range from zero to a maximum score of 24. [Maximum score of 24 is the sum of the following: 4 drops×1 inch plus a 4 drops×2 inches plus 4 drops×3 inches.]

TABLE VII

Sealing Performance of Gaskets Made From Plastisol Containing Hollow Glass Spheres

|  | 34 | 35 | 36 |
|---|---|---|---|
| Resin, phr |  |  |  |
| D6-42, homopolymer | 100 | 100 | — |
| Plasticizer, phr |  |  |  |
| Dioctyl Phthalate | 78 | 68 | — |
| Heat Stabilizer, phr |  |  |  |
| Calcium-zinc stearate | 0.8 | 1 | — |
| Zinc stearate | 1.2 | 1.5 | — |
| Separation Inhibitor, phr |  |  |  |
| Cab-O-Sil M5, phr | 0.1 | 0.3 | — |
| Wax, (127-130° F. melt pt) | 2 | 2 | — |
| Titanium dioxide | — | 0.8 | — |
| Chemical Blowing Agent | No | No | Yes |
| Hollow Glass Sphere, phr |  |  |  |
| Emerson & Cuming IG 25 (high alk) | 14 | — | — |
| 3M C15/250 (low alk) | — | 5.8 | — |
| Stack Test (% gas volume lost) | 0% | 0% | 0% |
| Abuse Angle Test | 24 | 24 | 23 |
| Abuse Angle Test (% of maximum) | 100% | 100% | 97% |

From Table VII it can be seen that sealing performance of gaskets which have their voids produced entirely by rigid hollow microspheres are equivalent or superior to gaskets having conventional flexible air voids.

EXAMPLES 37-38

Table VIII demonstrates the effect of flux temperature on the void volume of the fluxed plastisol derived from the composition of the present invention. The compositions of Examples 37 and 38 were prepared in the same manner as those employed in Examples 1-8. The composition of Example 37 contains a chemical blowing agent; the composition of Example 38 contains hollow glass microspheres.

The compositions were comprised as follows:

|  | 37 | 38 |
|---|---|---|
| Resin, phr D6-42 | 100 | 100 |
| Plasticizer, phr Dioctyl Phthalate | 65 | 65 |
| Heat Stabilizer, phr Calcium-zinc stearate | 2 | 2 |
| Separation Inhibitor, phr Wax; Microcrystalline Melt pt 140-145° F. | 10 | 10 |
| Chemical blowing agent, phr Azodicarbonamide | 3.3 | — |
| Hollow glass sphere, phr 3M C15/250 (low alk) | — | 13.6 |

The plastisol formulations were fluxed in standard 1¼ inch crowns for 37 seconds in a Dewey and Almy Baby Hurricane, Forced Draft Oven.

From the results of Table VIII it can be seen that the presence of hollow glass spheres in the plastisol composition brings about uniformity in the void volume of the fluxed sealing material over a wide range of fluxing temperature. When a chemical blowing agent is used there is a greater variation in the void volume of the plastisol fluxed over a range of temperatures. As noted previously, uniformity in void volume utlimately results in an improved seal.

TABLE VIII
Effects of Flux Temperature on the Void Volume of Plastisols

| | Example (#): | |
|---|---|---|
| | 37 | 38 |
| Source of Voids: | Chemical Blowing Agent | Hollow Microspheres |
| Flux Temperature (°F.) | Void Volumes (percent) | |
| 300 | −1.0 ± 0.6 | 24.8 ± 0.0 |
| 325 | −1.9 ± 0.8 | 24.5 ± 0.3 |
| 350 | −0.9 ± 0.3 | 24.4 ± 0.6 |
| 375 | 2.4 ± 3.2 | 25.1 ± 0.2 |
| 400 | 3.2 ± 3.1 | 24.9 ± 0.2 |
| 425 | 32.0 ± 5.1 | 25.2 ± 0.2 |
| 450 | 50.1 ± 5.4 | 25.4 ± 0.2 |

Table IX demonstrates the effect of film weight on the void volume of the fluxed plastisol derived from the composition of the present invention. The composition of Example 37 contains a chemical blowing agent, the composition of Example 38 contains hollow microspheres.

Table IX shows that the composition containing the hollow microspheres has a uniform void volume over a wide range of film weights over a wide range of fluxing temperatures. The composition containing the chemical blowing agent has a large variation of void volume for different film weights even at the same fluxing temperature.

TABLE IX
Effects of Film Weight and Temperature on the Void Volume of Plastisols

| Flux Temperature (°F.) | | Example 37 Chemical Blowing Agent | | Example 38 Hollow Microspheres | | |
|---|---|---|---|---|---|---|
| 375 | Weight (Milligrams) | 175 | 194 | 347 | 131 | 230 | 288 |
| | Void Volume (%) | 5.7 | 2.1 | −0.6 | 24.8 | 25.2 | 25.2 |
| 400 | Weight (Milligrams) | 309 | 388 | 432 | 133 | 200 | 213 |
| | Void Volume (%) | 6.6 | 0.5 | 2.4 | 24.7 | 25.0 | 25.1 |
| 425 | Weight (Milligrams) | 212 | 216 | 318 | 196 | 211 | 269 |
| | Void Volume (%) | 37.2 | 31.6 | 27.1 | 25.0 | 25.2 | 25.3 |
| 450 | Weight (Milligrams) | 180 | 263 | 296 | 172 | 175 | 180 |
| | Void Volume (%) | 56.4 | 46.7 | 47.3 | 25.6 | 25.3 | 25.4 |

What we claim is:

1. A sealing gasket having uniform void volume comprised of a plastisol comprised of a plasticizer and a resin wherein at least about 70 percent of said resin is formed by dispersion polymerization said plastisol having incorporated therein hollow discrete microspheres with alkalinity no greater than about 0.5 milliequivalent per gram, the diameter ranging from about 1 to about 1 to about 300 microns and a wall thickness of not in excess of about 5 microns.

2. The sealing gasket of claim 1 wherein about 100 percent of said resin is formed by dispersion polymerization.

3. The sealing gasket of claim 2 further comprising at least one separation inhibitor.

4. The sealing gasket of claim 1 wherein the hollow discrete microspheres are selected from the group consisting of glass, polystyrene resin, phenolic resin or polyvinylidene chloride acrylonitrile resin.

5. The sealing gasket of claim 4 wherein the hollow discrete microspheres have a diameter ranging from about 1 to about 300 microns and have a wall thickness not in excess of about 5 microns.

6. A sealing gasket having uniform void volume comprised of a plastisol comprised of a plasticizer and a resin wherein about 100 percent of said resin is formed by dispersion polymerization said plastisol having incorporated therein hollow discrete microspheres with alkalinity greater than about 0.5 milliequivalents per gram, the diameter ranging from about 1 to about 300 microns and having a wall thickness of not in excess of about 5 microns, and at least one separation inhibitor.

7. The sealing gasket of claim 6 wherein the separation inhibitor is selected from the group consisting of colloidal silica, bentonite clay, wax or some combination thereof.

8. The sealing gasket of claim 6 wherein the hollow discrete microspheres are glass.

9. A sealing gasket having uniform void volume comprised of a plastisol comprised of about 5 to about 150 parts by weight of plasticizer per 100 parts by weight of resin wherein at least about 70 percent of said resin is formed by dispersion polymerization said plastisol having incorporated therein and about 5 to about 100 parts by volume of resin of hollow discrete microspheres with alkalinity no greater than about 0.5 milliequivalents per grams, the diameter ranging from about 1 to about 300 microns and a wall thickness of not in excess of about 5 microns.

10. The sealing gasket of claim 9 further comprising about 0.1 to about 10 parts by weight of at least one separation inhibitor.

* * * * *